Jan. 25, 1944. H. A. KRILL 2,340,223
NASAL FILTER
Filed July 31, 1941
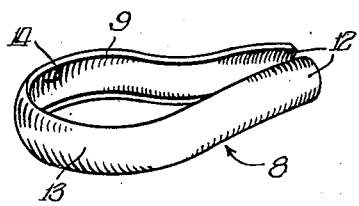
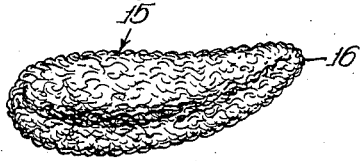
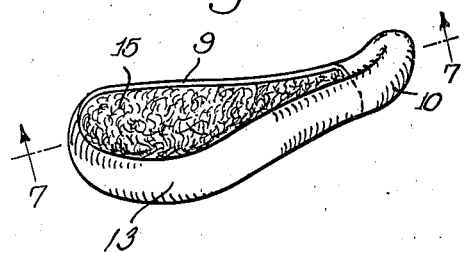
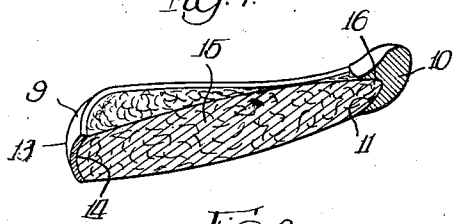
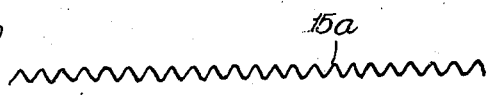
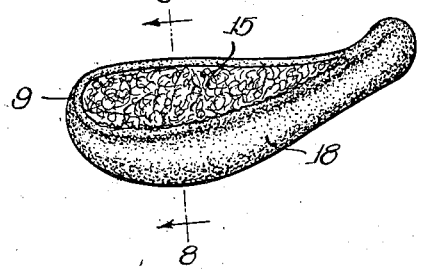
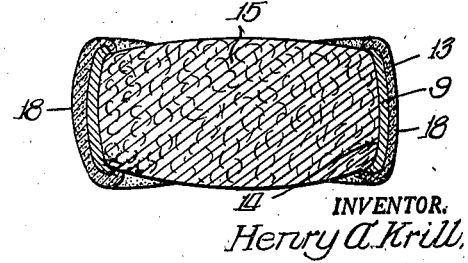
INVENTOR.
Henry A. Krill,
BY
Brown Jackson Boettcher Dienner
attys.

Patented Jan. 25, 1944

2,340,223

UNITED STATES PATENT OFFICE 2,340,223

NASAL FILTER

Henry A. Krill, Aurora, Ill.

Application July 31, 1941, Serial No. 404,752

3 Claims. (Cl. 128—148)

The present invention relates to improvements in nasal filters of the type which are adapted to be inserted into the nostril so that they are not visible.

In recent years there has been much activity in combating the injurious effects of dust and pollen upon the human being. It has been found that nasal filters are extremely beneficial in preventing irritants from entering the nasal passages of an individual. Prior nasal filters, however, are objectionable and not completely satisfactory for several reasons. For example, the frames or shells of prior filters irritate the nasal membranes, and, in addition, comprise an arrangement of parts which objectionably obstruct the passage of air therethrough. Further, the filtering pads or other filtering mediums have commonly been made of lamb's wool, cotton, and other organic materials to which many persons are allergic, and, when such filters are wetted by nasal discharges, they compact and their porous character is seriously impaired. Also, prior types of filters must be continuously replaced, and consequently are costly to use in addition to being inconvenient.

It is an object of my invention to provide a nasal filter shell of a construction in which no additional part or parts are necessary for holding the filtering medium or pad in the shell. In one form of the invention the filter shell may be provided with a coating of any suitable material which will not irritate the nasal membrane. Further, the coating may be applied to the shell in various thicknesses to assure an accurate fit in the nostril.

A further object is the provision of a novel filtering pad which may be readily removed from the shell and cleansed by boiling in water or treating with an antiseptic solution so that it may be reused. More specifically it is an object to form the shell of a thin metal wall of suitable material, the outer surface and inner surface of the wall, in cross-section, being substantially convex and concave, respectively, and the filtering medium comprising a resilient porous inorganic or metal pad which is adapted to be inserted into position within the shell upon slight compression, subsequent expansion of the pad causing the edges thereof to contact the inner concave surface of the shell for retaining the pad in position in the shell. I also provide the shell with a recessed tip member in which a tip portion of the filtering pad is adapted to be inserted to aid in retaining the pad in the shell.

Other objects and advantages will appear from the following detail description.

Now, in order to acquaint those skilled in the art with the manner of constructing and using my invention, I shall describe in connection with the accompanying drawing a preferred embodiment of the invention.

In the drawing:

Figure 1 is a view of a blank from which a filter frame or shell for a nostril is formed;

Figure 2 is a perspective view of the blank of Figure 1 bent to a shape substantially conforming in plan to the horizontal cross-sectional configuration of a human nostril;

Figure 3 is a perspective view of a tip member to which the ends of the metal strip of Figure 2 are secured;

Figure 4 is a plan view of the filtering pad of the present invention;

Figure 5 is a perspective view of the completed frame or shell with the filtering pad inserted therein;

Figure 6 is a perspective view of the complete nasal filter illustrating it after the filter shell has been coated with a material to render it non-irritable to the nasal membranes;

Figure 7 is a detail vertical sectional view taken on the line 7—7 of Figure 5;

Figure 8 is a detail vertical sectional view taken substantially along the line 8—8 of Figure 6; and Figure 9 is a detail view of a corrugated length of wire such as is used in forming the filtering pad, a portion only of the length of wire being shown.

Referring now to the drawing, I have shown a thin blank 8 of serpentine configuration which is adapted to be formed into a wall 9 of a somewhat elliptical shape, as shown in Figure 2, and preferably along the general lines of the horizontal cross-sectional configuration of the human nostril. A tip member 10 having a substantially V-shaped recess 11 is disposed between the ends 12—12 of the bent blank of Figure 2 with the recess extending inwardly of the wall 9. The tip member 10 is suitably secured to the ends 12—12 as by soldering. It will be seen in Figures 2 and 8 that the wall member 9 of the shell is formed with a convex outer surface 13 and a concave inner surface 14. The outer surfaces of the tip member 10 which are adapted to be disposed between the ends 12—12 of the wall 9 of the shell are of convex configuration to provide a snug fit therewith. In the preferred embodiment of my invention, the wall member 9 and tip member 10 are both preferably made of a non-toxic metal, such for example, as silver, or other like metal. In using a metal, such as silver, for making the blank it may be readily formed into the appropriate shape and yet the shell will possess sufficient strength and rigidity so as not to be easily deformed by normal handling. The shell may be formed of any suitable material other than metal such, for example, as a thermoplastic.

Formation of the shell in the manner described provides several advantages. First, by providing the concave and convex surfaces the strength of the shell is greatly enhanced; secondly, upon insertion of the shell in the nostril there are no sharp edges to injure the nasal membranes; and, thirdly, a holding means for the filter pad is provided and which will be hereinafter more fully described.

The filtering pad 15, shown in Figure 4 of the drawing, is preferably made of non-toxic metal, and in a device built in accordance with the invention relatively thin silver wire was found to be satisfactory. Preferably, a suitable length of corrugated silver wire 15a (Figure 9) is crumpled together, and is rolled and compacted, conveniently between the palms of the hands, to provide a pad 15 of the shape shown in the drawing. The porosity of the pad can be controlled by varying the length and fineness of wire used, the pressure exerted in compacting the wire, and related factors. If, for example, a filtering pad having extremely small and numerous pores is desired, a relatively long length of fine wire is used. If, on the other hand, a relatively open filtering pad is desired, a shorter length of coarser wire is used. Also, since the sizes of nostril passages of human beings vary considerably, appropriate lengths of filter wires may be used in making the filter pads to meet the various requirements. Due to the inherent resiliency of the wire, the corrugations thereof retain their shape in the pad, providing numerous air passages therethrough, and saturation of the pad by moisture will not cause restriction of such passages. That avoids a serious objection to pads formed of wool or other like organic materials, the fibre of which absorbs moisture and which pack when wet, causing serious restriction of the air passages therethrough. Also, the corrugations of the wire provide numerous spring elements of appreciable resiliency, the pad as a whole possessing considerable total resiliency sufficient to assure its retention in the shell without necessity for providing supplementary pad retaining means.

The filtering shell and the filtering pad shown in the drawing are of a shape suitable for use in the right nostril of an individual, and it will be understood that in the preferred use of the invention two of such shells and filtering units are employed, the left filtering shell and pad being appropriately formed. The filtering pad 15 is formed with a tip portion 16, and it will be seen that, if the filter pad 15 is made slightly larger than the opening of the shell, it may be compressed slightly and inserted within the confines of the filter shell, with the tip 15 of the filter pad being inserted in the recess 11 of the tip member 10. The filter pad 15 is thus forced within the confines of the shell, in which it expands so that its edges fit the concave surface 14 of the wall member 9 and are held thereagainst under pressure sufficient to retain it in position. It will thus be seen that the filtering pad 15 will be yieldingly retained in the filter shell and may be easily removed for cleaning.

If desired, the filter shell comprising the wall 9 and tip portion 10 may have their outer surfaces coated with a suitable material which will not irritate the nasal membrane. For this purpose a mixture of beeswax and paraffin may be melted in a water bath at the appropriate temperature, and the mixture applied to the outer surfaces of the shell and the tip member, so that when the shell is inserted in the nostril it will not come into direct contact with the nasal membranes. Furthermore, by varying the thickness of the coating upon the various portions of the wall member 9 and the tip member 10 an accurate fitting of the filter unit in the nostril may be obtained, thus compensating for any irregularities in the forming of the shell. In Figure 8 it will be seen that the coating 18 is substantially thicker at the left of the figure than at the right of the figure to attain the accurate fit referred to above.

Upon the insertion of the assembled nasal filter unit, shown in Figure 6, into the nostril, the normal nasal discharges will wet the filtering pad 15 so that dust or pollen in the air being drawn through the filtering pad will be caught. If desired, a few drops of paraffin oil in which some menthol has been dissolved may be placed upon the filtering pad to increase its efficiency in trapping foreign materials, the menthol, in addition, serving to clear the nasal passages. It will be understood that my invention comprehends the application of any suitable medicated solution to the filtering pad 15 for the purpose referred to or for other purposes.

The filtering pad may be easily removed from the filtering frame or shell and may then be cleansed by subjecting the pad to boiling water or to any suitable antiseptic liquid or solution.

In practice a filter is provided for each nostril, and, if desired, they may be connected together in any suitable manner, for example, by means of a U-shaped member adapted to be disposed below the septum of the nose and connected to the shell member of each filter.

While I have shown and described what I consider to be the preferred embodiment of my invention, it will be understood that modifications may be made therein without departing from the spirit and scope of the invention.

I claim:

1. A nasal filter shell open at its top and bottom and comprising a wall member, and a tip member, said wall member being shaped in plan to conform substantially to the horizontal cross-sectional configuration of a human nostril, the ends of the wall member being secured to said tip member, the outer surface and inner surface of said wall member in cross-section being substantially convex and concave, respectively, and the tip member having a recess opening inwardly of said shell.

2. In combination, a nasal filter shell open at its top and bottom and comprising a wall member and a tip member, said wall member being shaped to conform in plan to substantially the horizontal cross-sectional configuration of a human nostril, the ends of the wall member being secured to said tip member, the outer surface and inner surface of the wall member being substantially convex and concave, respectively, said tip member having a recess opening inwardly of said wall member, and a non-absorbent resilient porous filter pad formed with a tip portion shaped to fit in lieu thereof in said recess, of said tip member said pad being held in said shell with its tip portion in said recess by the inherent resiliency of said pad.

3. A nasal filter shell open at its top and bottom and comprising a wall member, and a tip member, said wall member being shaped in plan to conform substantially to the horizontal cross sectional configuration of a human nostril, the ends of said wall member being secured to said tip member, the outer surface and inner surface of said wall member in cross section being substantially convex and concave, respectively, and the tip member being of a greater thickness than the thickness of said wall member to provide a body of appreciable mass at the ends of said wall member.

HENRY A. KRILL.

CERTIFICATE OF CORRECTION.

Patent No. 2,340,223. January 25, 1944.
HENRY A. KRILL.

It is hereby certified that error appears in the printed specification of the above numbered patent requiring correction as follows: Page 3, first column, line 1, claim 2, after "fit" strike out --in lieu thereof--; and that the said Letters Patent should be read with this correction therein that the same may conform to the record of the case in the Patent Office.

Signed and sealed this 4th day of April, A. D. 1944.

Leslie Frazer

(Seal) Acting Commissioner of Patents.